United States Patent
Silverbrook (12)

(10) Patent No.: US 6,472,052 B1
(45) Date of Patent: Oct. 29, 2002

(54) DIGITAL CAMERA PRINT ROLL WITH PERIODIC ANISOTROPIC STIFFNESS

(75) Inventor: Kia Silverbrook, Sydney (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/112,744

(22) Filed: Jul. 10, 1998

(30) Foreign Application Priority Data

Jul. 15, 1997 (AU) ............................................. PO 8019

(51) Int. Cl.⁷ .................................................. B32B 3/00
(52) U.S. Cl. ........................ 428/195; 428/156; 428/167
(58) Field of Search ................................. 428/166, 167, 428/174, 175, 182, 195, 156; 442/182, 189

(56) References Cited

U.S. PATENT DOCUMENTS 5,154,956 A * 10/1992 Fradich ....................... 428/40
5,613,175 A * 3/1997 Frankel ....................... 399/162
5,624,732 A * 4/1997 Oshima et al. ............. 428/167
5,731,062 A * 3/1998 Kim et al. ................... 428/175

* cited by examiner

Primary Examiner—Bruce H. Hess

(57) ABSTRACT

Print media, when rolled tightly often produces a high degree of curl when removed from a roll form. The stiffer the media, the more likely the tendency to curl. On the other hand, print media that is too thin will be too floppy for conventional handling. The print media described is constructed from fine ribs of greater stiffness running along the axis of a roll. These ribs ideally have a pitch of approximately 200 microns and they can be either formed from embedded fibre of greater stiffness or through ridges of greater thickness. The ribs result in material of greater stiffness across the width of the media than along the length and maintain adequate stiffness for handling and viewing of the printed media.

7 Claims, 8 Drawing Sheets

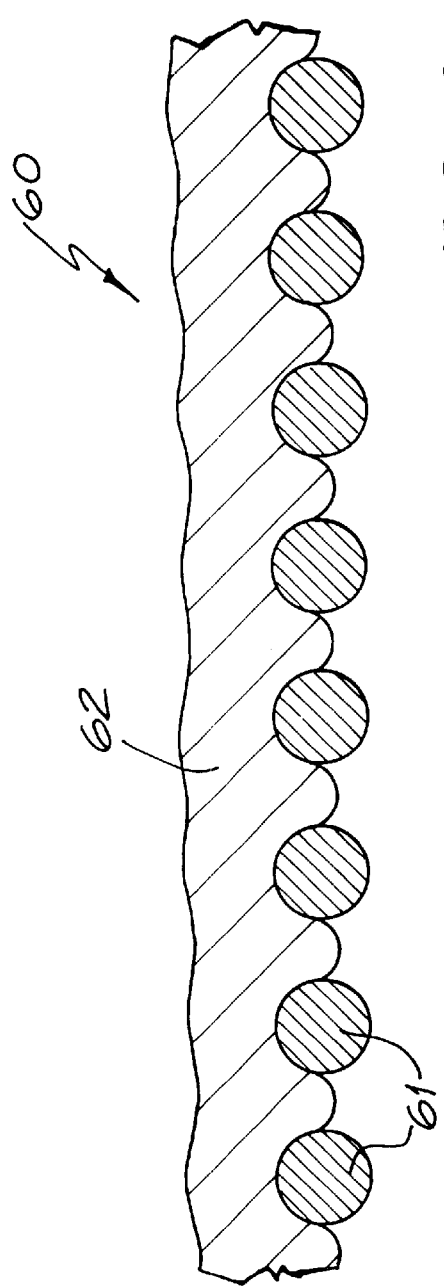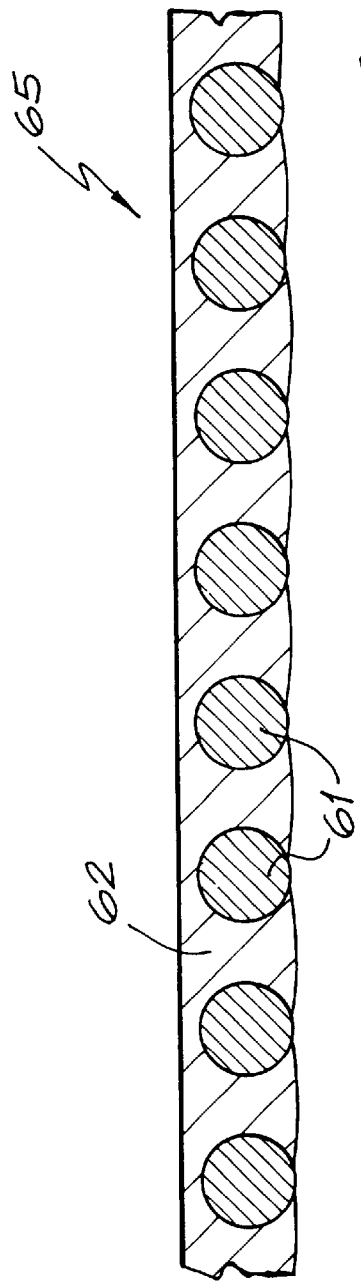

DIGITAL CAMERA PRINT ROLL WITH PERIODIC ANISOTROPIC STIFFNESS

CROSS REFERENCES TO RELATED APPLICATIONS

The following Australian provisional patent applications are hereby incorporated by cross-reference. For the purposes of location and identification, U.S. patent applications identified by their U.S. patent application Ser. Nos. (U.S. Ser. No.) are listed alongside the Australian applications from which the U.S. patent applications claim the right of priority.

| CROSS-REFERENCED AUSTRALIAN PROVISIONAL PATENT NO. | U.S. PATENT APPLICATION SER. NO. (CLAIMING RIGHT OF PRIORITY FROM AUSTRALIAN PROVISIONAL APPLICATION) | DOCKET NO. |
|---|---|---|
| PO7991 | 09/113,060 | ART01 |
| PO8505 | 09/113,070 | ART02 |
| PO7988 | 09/113,073 | ART03 |
| PO9395 | 09/112,748 | ART04 |
| PO8017 | 09/112,747 | ART06 |
| PO8014 | 09/112,776 | ART07 |
| PO8025 | 09/112,750 | ART08 |
| PO8032 | 09/112,746 | ART09 |
| PO7999 | 09/112,743 | ART10 |
| PO7998 | 09/112,742 | ART11 |
| PO8031 | 09/112,741 | ART12 |
| PO8030 | 09/112,740 | ART13 |
| PO7997 | 09/112,739 | ART15 |
| PO7979 | 09/113,053 | ART16 |
| PO8015 | 09/112,738 | ART17 |
| PO7978 | 09/113,067 | ART18 |
| PO7982 | 09/113,063 | ART19 |
| PO7989 | 09/113,069 | ART20 |
| PO8019 | 09/112,744 | ART21 |
| PO7980 | 09/113,058 | ART22 |
| PO8018 | O9/112,777 | ART24 |
| PO7938 | 09/113,224 | ART25 |
| PO8016 | 09/112,804 | ART26 |
| PO8024 | 09/112,805 | ART27 |
| PO7940 | 09/113,072 | ART28 |
| PO7939 | 09/112,785 | ART29 |
| PO8501 | 09/112,797 | ART30 |
| PO8500 | 09/112,796 | ART31 |
| PO7987 | 09/113,071 | ART32 |
| PO8022 | 09/112,824 | ART33 |
| PO8497 | 09/113,090 | ART34 |
| PO8020 | 09/112,823 | ART38 |
| PO8023 | 09/113,222 | ART39 |
| PO8504 | 09/112,786 | ART42 |
| PO8000 | 09/113,051 | ART43 |
| PO7977 | 09/112,782 | ART44 |
| PO7934 | 09/113,056 | ART45 |
| PO7990 | 09/113,059 | ART46 |
| PO8499 | 09/113,091 | ART47 |
| PO8502 | 09/112,753 | ART48 |
| PO7981 | 09/113,055 | ART50 |
| PO7986 | 09/113,057 | ART51 |
| PO7983 | 09/113,054 | ART52 |
| PO8026 | 09/112,752 | ART53 |
| PO8027 | 09/112,759 | ART54 |
| PO8028 | 09/112,757 | ART56 |
| PO9394 | 09/112,758 | ART57 |
| PO9396 | 09/113,107 | ART58 |
| PO9397 | 09/112,829 | ART59 |
| PO9398 | 09/112,792 | ART60 |
| PO9399 | 09/112,791 | ART61 |
| PO9400 | 09/112,790 | ART62 |
| PO9401 | 09/112,789 | ART63 |
| PO9402 | 09/112,788 | ART64 |
| PO9403 | 09/112,795 | ART65 |
| PO9405 | 09/112,749 | ART66 |
| PP0959 | 09/112,784 | ART68 |
| PP1397 | 09/112,783 | ART69 |
| PP2370 | 09/112,781 | DOT01 |
| PP2371 | 09/113,052 | DOT02 |
| PO8003 | 09/112,834 | Fluid01 |
| PO8005 | 09/113,103 | Fluid02 |
| PO9404 | 09/113,101 | Fluid03 |
| PO8066 | 09/112,751 | IJ01 |
| PO8072 | 09/112,787 | IJ02 |
| PO8040 | 09/112,802 | IJ03 |
| PO8071 | 09/112,803 | IJ04 |
| PO8047 | 09/113,097 | IJ05 |
| PO8035 | 09/113,099 | IJ06 |
| PO8044 | 09/113,084 | IJ07 |
| PO8063 | 09/113,066 | IJ08 |
| PO8057 | 09/112,778 | IJ09 |
| PO8056 | 09/112,779 | IJ10 |
| PO8069 | 09/113,077 | IJ11 |
| PO8049 | 09/113,061 | IJ12 |
| PO8036 | 09/112,818 | IJ13 |
| PO8048 | 09/112,816 | IJ14 |
| PO8070 | 09/112,772 | IJ15 |
| PO8067 | 09/112,819 | IJ16 |
| PO8001 | 09/112,815 | IJ17 |
| PO8038 | 09/113,096 | IJ18 |
| PO8033 | 09/113,068 | IJ19 |
| PO8002 | 09/113,095 | IJ20 |
| PO8068 | 09/112,808 | IJ21 |
| PO8062 | 09/112,809 | IJ22 |
| PO8034 | 09/112,780 | IJ23 |
| PO8039 | 09/113,083 | IJ24 |
| PO8041 | 09/113,121 | IJ25 |
| PO8004 | 09/113,122 | IJ26 |
| PO8037 | 09/112,793 | IJ27 |
| PO8043 | 09/112,794 | IJ28 |
| PO8042 | 09/113,128 | IJ29 |
| PO8064 | 09/113,127 | IJ30 |
| PO9389 | 09/112,756 | IJ31 |
| PO9391 | 09/112,755 | IJ32 |
| PP0888 | 09/112,754 | IJ33 |
| PP0891 | 09/112,811 | IJ34 |
| PP0890 | 09/112,812 | IJ35 |
| PP0873 | 09/112,813 | IJ36 |
| PP0993 | 09/112,814 | IJ37 |
| PP0890 | 09/112,764 | IJ38 |
| PP1398 | 09/112,765 | IJ39 |
| PP2592 | 09/112,767 | IJ40 |
| PP2593 | 09/112,768 | IJ41 |
| PP3991 | 09/112,807 | IJ42 |
| PP3987 | 09/112,806 | IJ43 |
| PP3985 | 09/112,820 | IJ44 |
| PP3983 | 09/112,821 | IJ45 |
| PO7935 | 09/112,822 | IJM01 |
| PO7936 | 09/112,825 | IJM02 |
| PO7937 | 09/112,826 | IJM03 |
| PO8061 | 09/112,827 | IJM04 |
| PO8054 | 09/112,828 | IJM05 |
| PO8065 | 09/113,111 | IJM06 |
| PO8055 | 09/113,108 | IJM07 |
| PO8053 | 09/113,109 | IJM08 |
| PO8078 | 09/113,123 | IJM09 |
| PO7933 | 09/113,114 | IJM10 |
| PO7950 | 09/113,115 | IJM11 |
| PO7949 | 09/113,129 | IJM12 |
| PO8060 | 09/113,124 | IJM13 |
| PO8059 | 09/113,125 | IJM14 |
| PO8073 | 09/113,126 | IJM15 |
| PO8076 | 09/113,119 | IJM16 |
| PO8075 | 09/113,120 | IJM17 |
| PO8079 | 09/113,221 | IJM18 |
| PO8050 | 09/113,116 | IJM19 |
| PO8052 | 09/113,118 | IJM20 |
| PO7948 | 09/113,117 | IJM21 |
| PO7951 | 09/113,113 | IJM22 |

-continued

| CROSS-REFERENCED AUSTRALIAN PROVISIONAL PATENT NO. | U.S. PATENT APPLICATION SER. NO. (CLAIMING RIGHT OF PRIORITY FROM AUSTRALIAN PROVISIONAL APPLICATION) | DOCKET NO. |
|---|---|---|
| PO8074 | 09/113,130 | IJM23 |
| PO7941 | 09/113,110 | IJM24 |
| PO8077 | 09/113,112 | IJM25 |
| PO8058 | 09/113,087 | IJM26 |
| PO8051 | 09/113,074 | IJM27 |
| PO8045 | 09/113,089 | IJM28 |
| PO7952 | 09/113,088 | IJM29 |
| PO8046 | 09/112,771 | IJM30 |
| PO9390 | 09/112,769 | IJM31 |
| PO9392 | 09/112,770 | IJM32 |
| PP0889 | 09/112,798 | IJM35 |
| PP0887 | 09/112,801 | IJM36 |
| PP0882 | 09/112,800 | IJM37 |
| PP0874 | 09/112,799 | IJM38 |
| PP1396 | 09/113,098 | IJM39 |
| PP3989 | 09/112,833 | IJM40 |
| PP2591 | 09/112,832 | IJM41 |
| PP3990 | 09/112,831 | IJM42 |
| PP3986 | 09/112,830 | IJM43 |
| PP3984 | 09/112,836 | IJM44 |
| PP3982 | 09/112,835 | IJM45 |
| PP0895 | 09/113,102 | IR01 |
| PP0870 | 09/113,106 | IR02 |
| PP0869 | 09/113,105 | IR04 |
| PP0887 | 09/113,104 | IR05 |
| PP0885 | 09/112,810 | IR06 |
| PP0884 | 09/112,766 | IR10 |
| PP0886 | 09/113,085 | IR12 |
| PP0871 | 09/113,086 | IR13 |
| PP0876 | 09/113,094 | IR14 |
| PP0877 | 09/112,760 | IR16 |
| PP0878 | 09/112,773 | IR17 |
| PP0879 | 09/112,774 | IR18 |
| PP0883 | 09/112,775 | IR19 |
| PP0880 | 09/112,745 | IR20 |
| PP0881 | 09/113,092 | IR21 |
| PO8006 | 09/113,100 | MEMS02 |
| PO8007 | 09/113,093 | MEMS03 |
| PO8008 | 09/113,062 | MEMS04 |
| PO8010 | 09/113,064 | MEMS05 |
| PO8011 | 09/113,082 | MEMS06 |
| PO7947 | 09/113,081 | MEMS07 |
| PO7944 | 09/113,080 | MEMS09 |
| PO7946 | 09/113,079 | MEMS10 |
| PO9393 | 09/113,065 | MEMS11 |
| PP0875 | 09/113,078 | MEMS12 |
| PP0894 | 09/113,075 | MEMS13 |

STATEMENT REGARDING FEDERALLY SPONSORED RESEARCH OR DEVELOPMENT

Not applicable.

FIELD OF THE INVENTION

The present invention relates to an image processing method and apparatus and, in particular, discloses an anisotropic media - ridged/fibre.

The present invention relates to print media and discloses a process of treatment so as to reduce the likelihood of "curling" in print media.

BACKGROUND OF THE INVENTION

Recently, it has become more and more popular in respect of photographic reproduction techniques to produce longer and longer "panoramic" views of an image. These images can be produced on photographic paper or the like and the structure of the image is normally to have longer and longer lengths in comparison to the width so as to produce the more "panoramic" type views.

Unfortunately, this imposes a problem where the photographic paper to be imaged upon originally was stored on a roll of small diameter.

For example, referring to FIG. 1, the print media upon which an image is to be printed can be stored on a small roll 3 for an indefinite period of time. The storage on the roll 3 can often impart a semi-permanent "curl" to the paper 4. Subsequently, a portion of the roll 3 is unrolled as required and an image 5 is deposited on the media by means of printing and/or photographic imaging. The print media with its image 5 is normally held in place by means of rollers so as to ensure an accurate, flat, plane surface is provided for any imaging device utilising the print media. At a subsequent phase of the processing the print media is normally cut into desired length and stacked in a "sheet" form 6.

However, when the print media is stored for long periods of time in a tightly curled roll, the print media 4 can take on a memory characteristic due to being curled around roller 3 for the extended period of time. Hence, images produced utilizing this process can often include an unwanted curl 7 consequential upon being tightly curled around roll 3. This is generally an undesirable characteristic. Of course, one way to overcome this problem is to increase the circumference of roll 3 and to thereby flatten the circumference of any paper roll around the roll 3. However, increasing the circumference of roll 3 is not desirable should it be required to include the roll 3 in a portable hand held type camera device. The portable nature of such a device requires as small a roll 3 as possible thereby leading to increasing levels of curl.

SUMMARY OF THE INVENTION

It is an object of the present invention to provide a form of print media having reduced curl characteristics.

In accordance with the first aspect of the present invention there is provided a print media having a reduced degree of curling in use, said print media having anisotropic stiffness in the direction of said planes.

In accordance with the second aspect of the present invention there is provided a method of reducing the curl in an image printed on print media having an anisotropic stiffness, said method comprising applying a localized pressure to a portion of said print media.

BRIEF DESCRIPTION OF THE DRAWINGS

Notwithstanding any other forms which may fall within the scope of the present invention, preferred forms of the invention will now be described, by way of example only, with reference to the accompanying drawings which:

FIG. 2 and FIG. 2a illustrate the structure of the print media constructed in accordance with the present invention;

FIGS. 6 and 7 illustrate schematic cross-sectional views of a further form of construction of print media in accordance with the present invention;

DESCRIPTION OF PREFERRED AND OTHER EMBODIMENTS

In the preferred embodiment of the present invention, the print media to be stored in a tightly rolled form is processed to have an anisotropic ribbed structure which allows the print media to be suitable for carriage in a roll form but further allows for the anisotropic rib structure to be utilized when viewing images printed on the print media so as to reduce the extent of curling of the print media.

Figure 1:
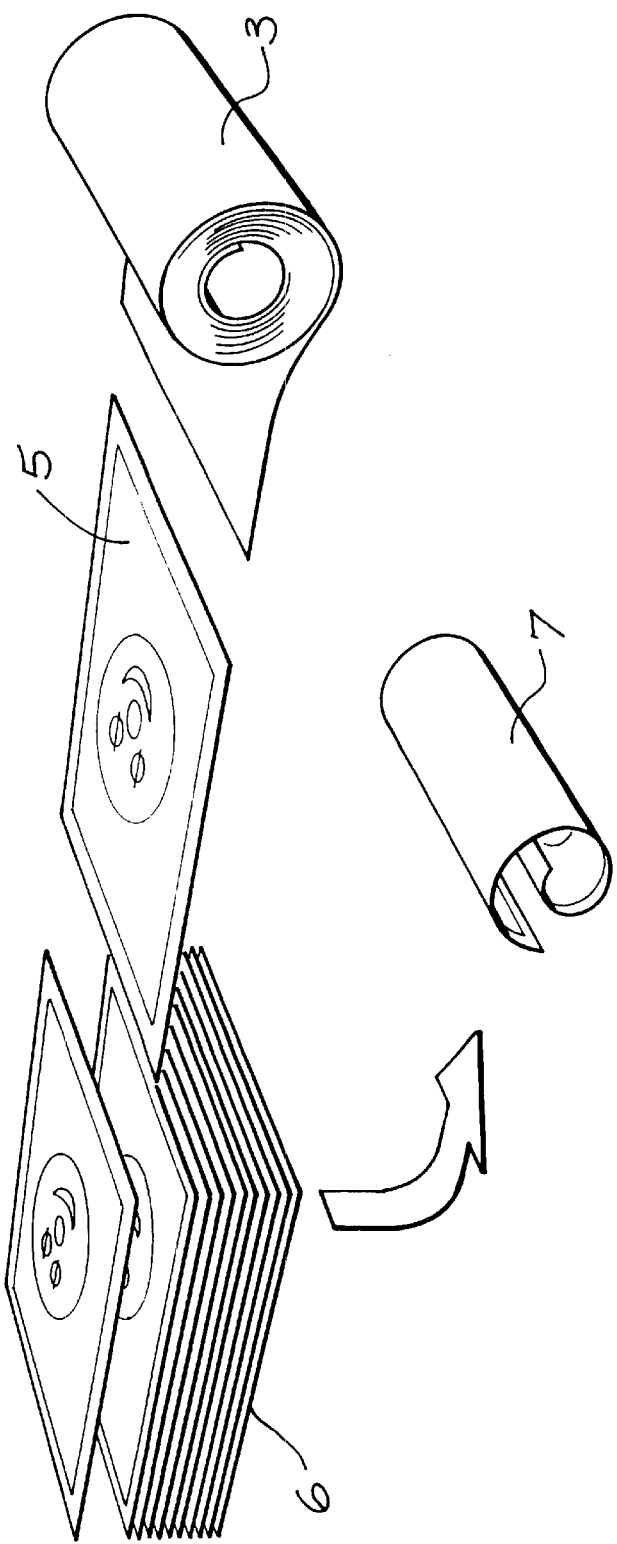
FIG. 1 illustrates schematically a method of creation of images on print media.
Figure 2:
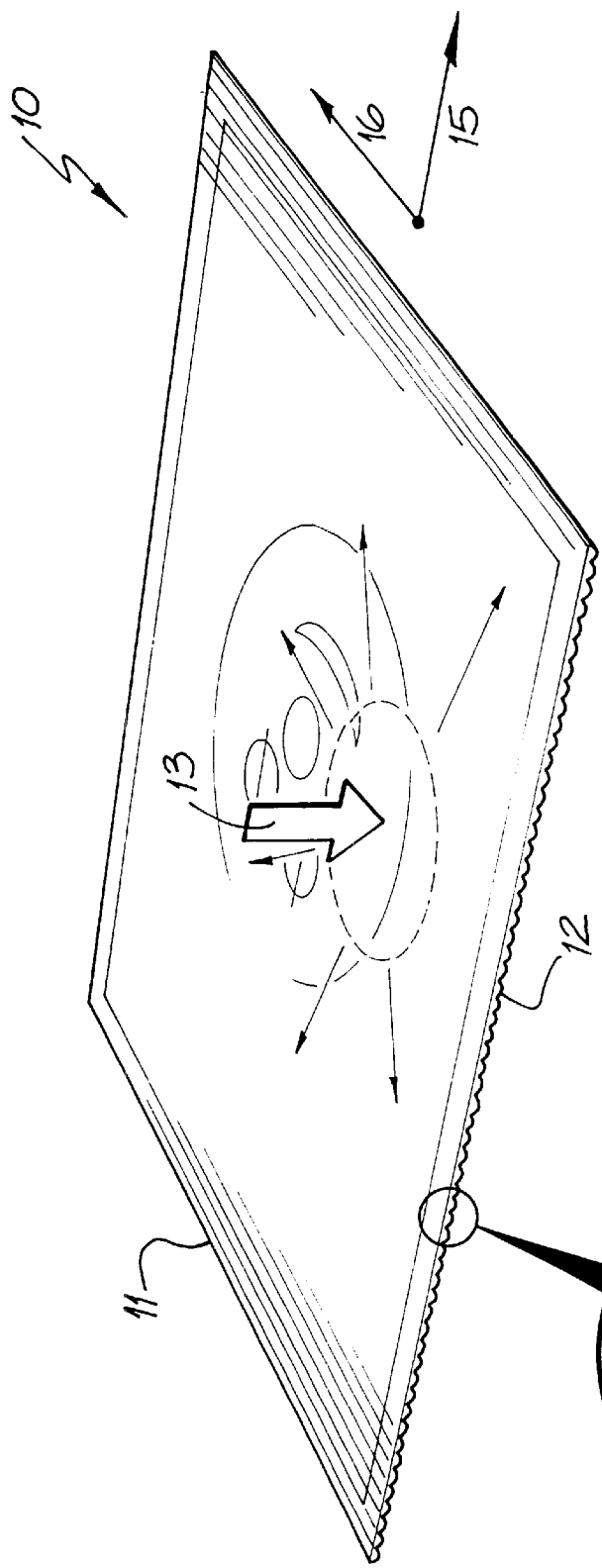

Referring now to FIG. 2, there is illustrated a sheet 10 of print media 11 as treated in accordance with the principles of the present invention. The sheet 10 is preferably constructed of a plastic planar film although other forms of film 11 would be suitable. The sheet 10 is pre-treated to have a polymer rib-like structure 12 shown in FIG. 2 in an exaggerated form with the actual column pitch being approximately 200 µm. Hence, one surface of the sheet 10 is treated so as to have a series of columns e.g. 12 running up and down the length of the sheet 10, the cross-section of the column 12 being illustrated in an enlarged form in FIG. 2a.

The advantage of utilizing the series of columns or ribs 12 is evident when a force 13 is applied to a portion of the surface area of the sheet 10. The column 12, although allowing the sheet 10 to be rolled tightly, resists any rolling of the sheet 10 in the direction 16. Hence, any force applied 13 is likely to be transmitted both in directions 15 and 16. The anisotropic nature of the sheet 10 will result in the rib, 12 acting to provide support both in directions 15 and 16 thereby limiting the curl of sheet 10. The resistance is primarily due to the resistance of ribs 12 from any bending in the direction 16. The anisotropic strength of the material also allows it to be stored on a roll with the greater strength axis being along the central axis of the roll.

Figure 3:
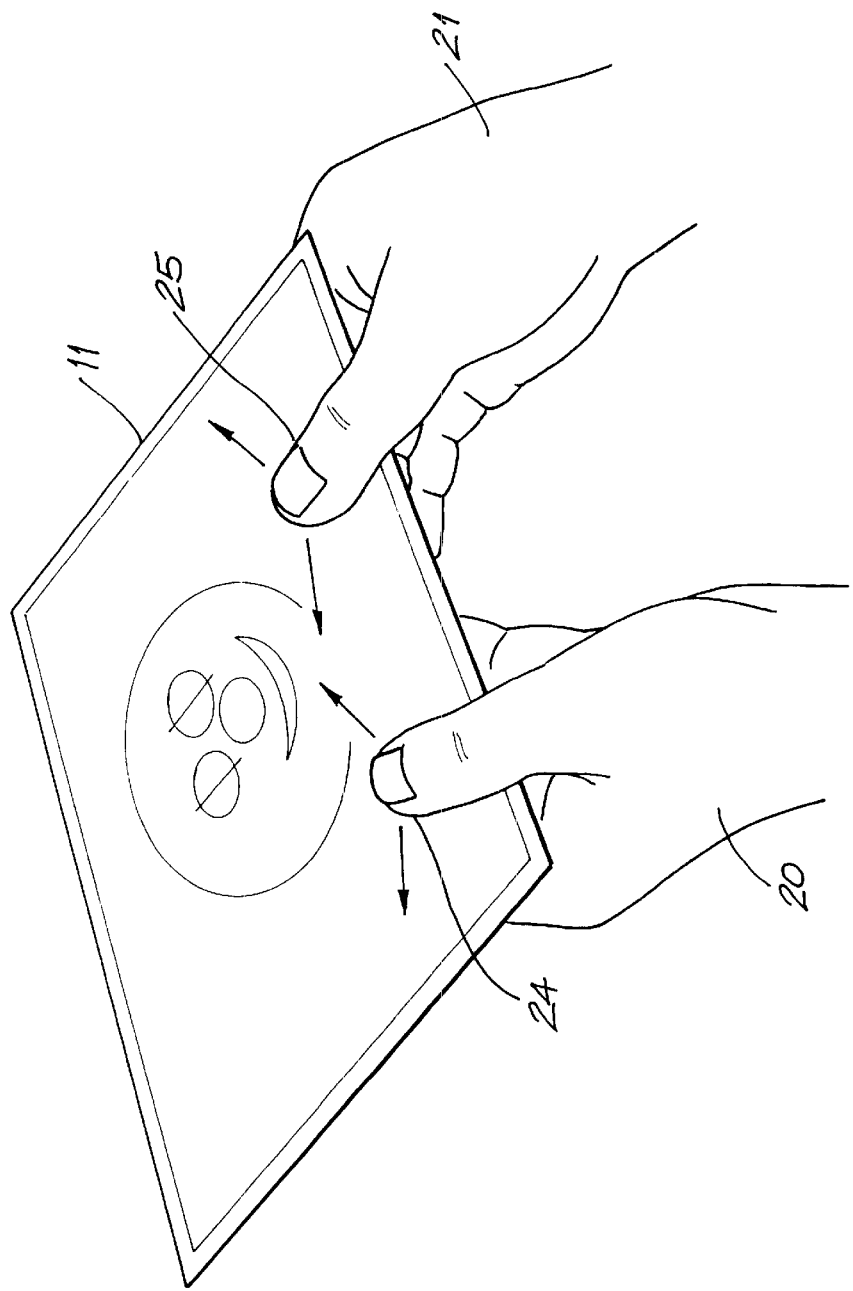
FIG. 3 illustrates utilization of the print media constructed in accordance with the preferred embodiment.

Referring now to FIG. 3, the image on sheet 10 can then be viewed, with reduced effects due to curling, by merely holding the sheet 10 in a user's hands 20, 21 and applying subtle pressure at points 24, 25. The application of pressure at points 24, 25 is transmitted throughout the sheet 10 thereby providing a flat viewing surface with limited curling.

Figures 4, 4A:
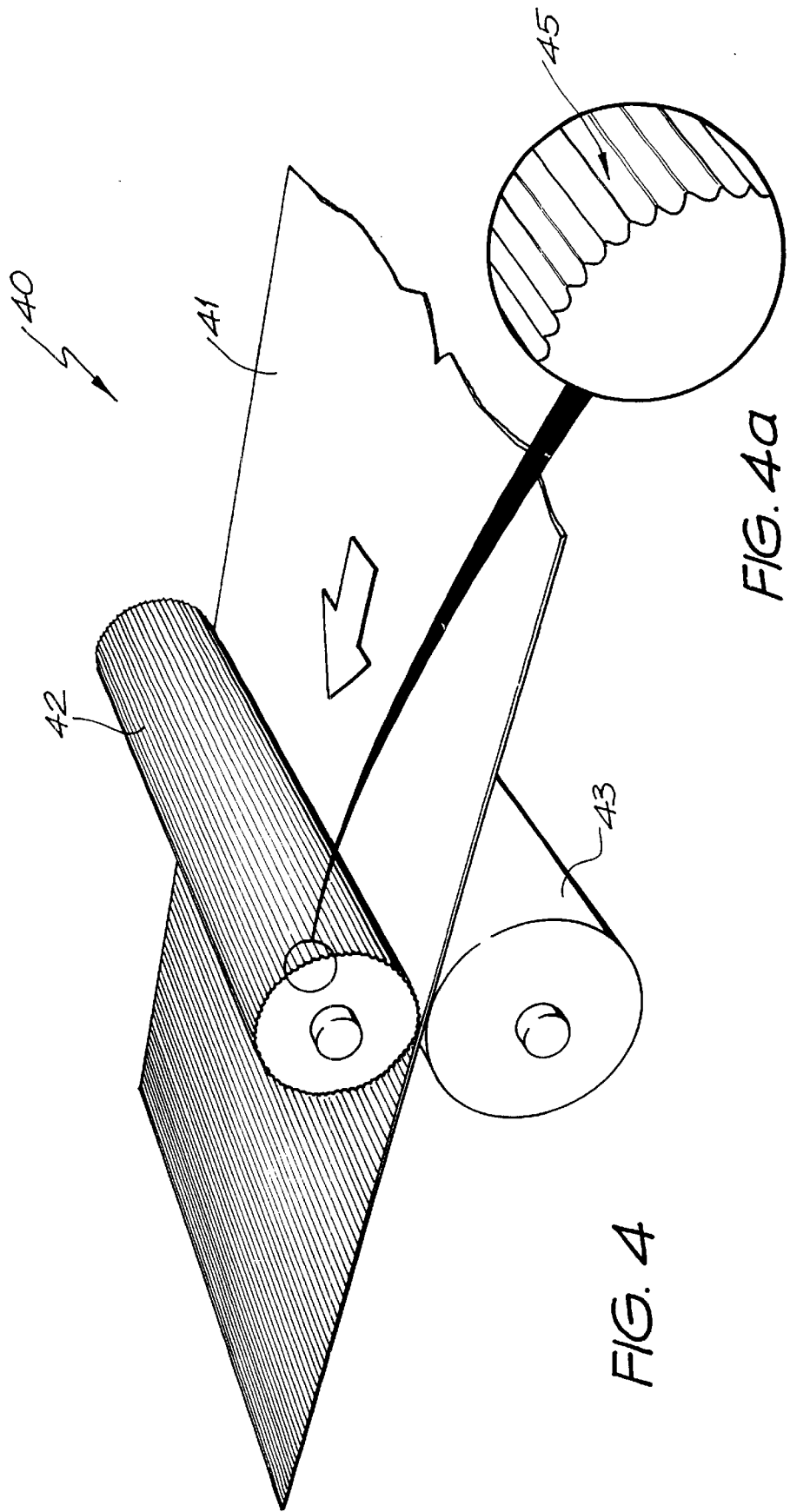
FIG. 4 illustrates a first form of construction of print media in accordance with the preferred embodiment.
Figure 5:
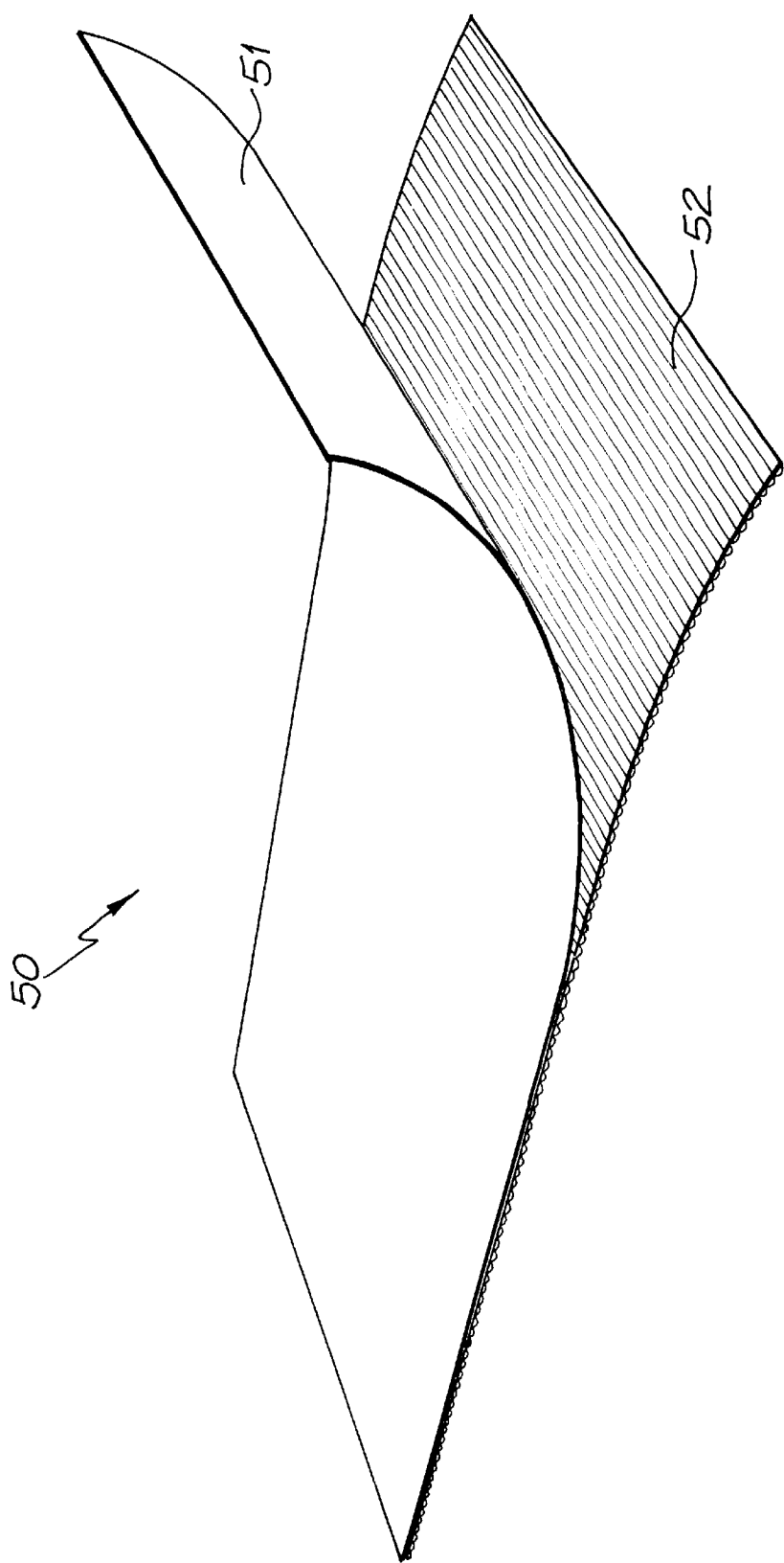
FIG. 5 illustrates a further form of construction of print media in accordance with the present invention.

Of course, the anisotropic media can be produced utilizing a number of techniques where the media comprises a plastic type material, For example, it could be produced by methods of extrusion. Alternatively, other techniques can be utilized. For example, one form of production 40 is illustrated schematically in FIG. 4 and relies upon the media 41 being pressed between rollers 42, 43. The roller 43 has a flat surface with the roller 42 having a serrated surface 45 as illustrated in FIG. 4a. The dimensions of the serration are exaggerated in FIG. 4 for illustrative purposes.

Where the media is unsuitable for utilization in such a process 40, the anisotropic media can be provided by utilizing two film surfaces joined together. Such a process 50 is illustrated in FIG. 5 wherein a first surface 51 upon which it is desired to print an image is mated with a second surface 52 by means of glue, heat fusion etc. as required.

Furthermore, other forms of manufacture of the print media 11 are possible. For example, referring to FIGS. 6 and 7, the construction of print media 60 is shown in cross-section and could be constructed from a first fibrous material 61 which can comprise strong polymer based fibres constructed from annealed polyethylene napthalate drawn into a fibrous form. A second heat flowable polymer 62 which can comprise polyethylene is utilized to provide the "paper" base for the carriage of ink/imaging chemicals. The media polymer 62 can be compressed with the fibrous material 61 while still in a viscous form (for example, after being heated) so that the fibre 61 and print base 62 form one integral unit as illustrated in FIG. 7. The arrangement of FIGS. 6 and 7 can be constructed in accordance with a number of techniques.

Figure 8:
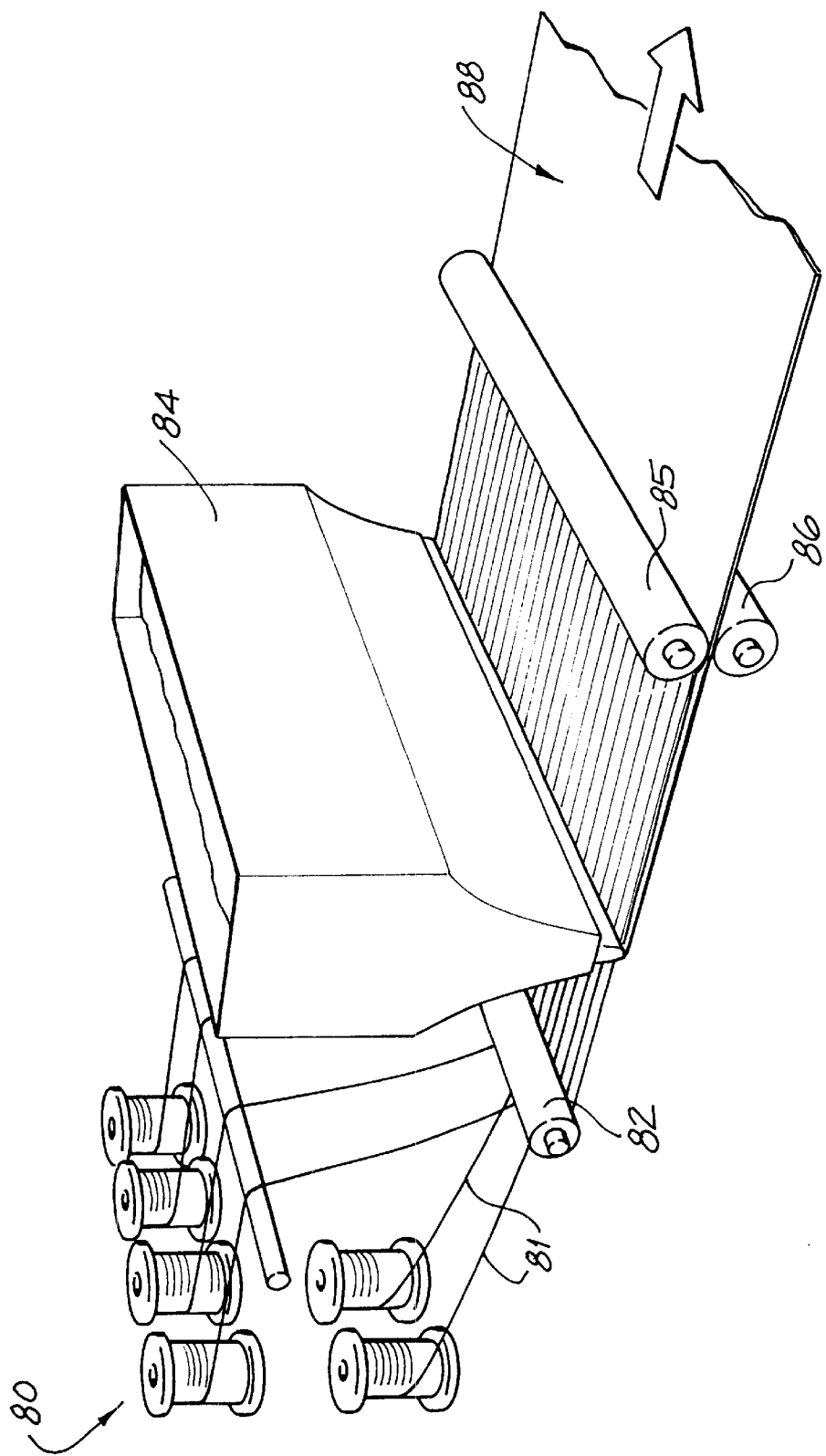
FIG. 8 illustrates one form of manufacture of the print media construction in accordance with FIGS. 6 and 7.

Referring now to FIG. 8, there is illustrated a first such technique which utilizes pre-formed spools e.g. 80 of fibrous material, the number of spools and corresponding fibres 81 being equivalent in number to the length of the desired print roll. The spools 80 are ranged such that corresponding fibres 81 are fed over a first roller 82. The fibres 81 are then drawn past a print media application unit 84 which applies the layer of viscous heated print media to the fibres. Subsequently, rollers 85, 86 apply the necessary pressure to the fibres and print media so as to fuse the two together and flatten the surface of the print media so as to form a final anisotropic surface 88. Subsequently, the surface 88 is cut across its width and rolled to form anisotropic print media as hereinbefore described.

Figure 9:
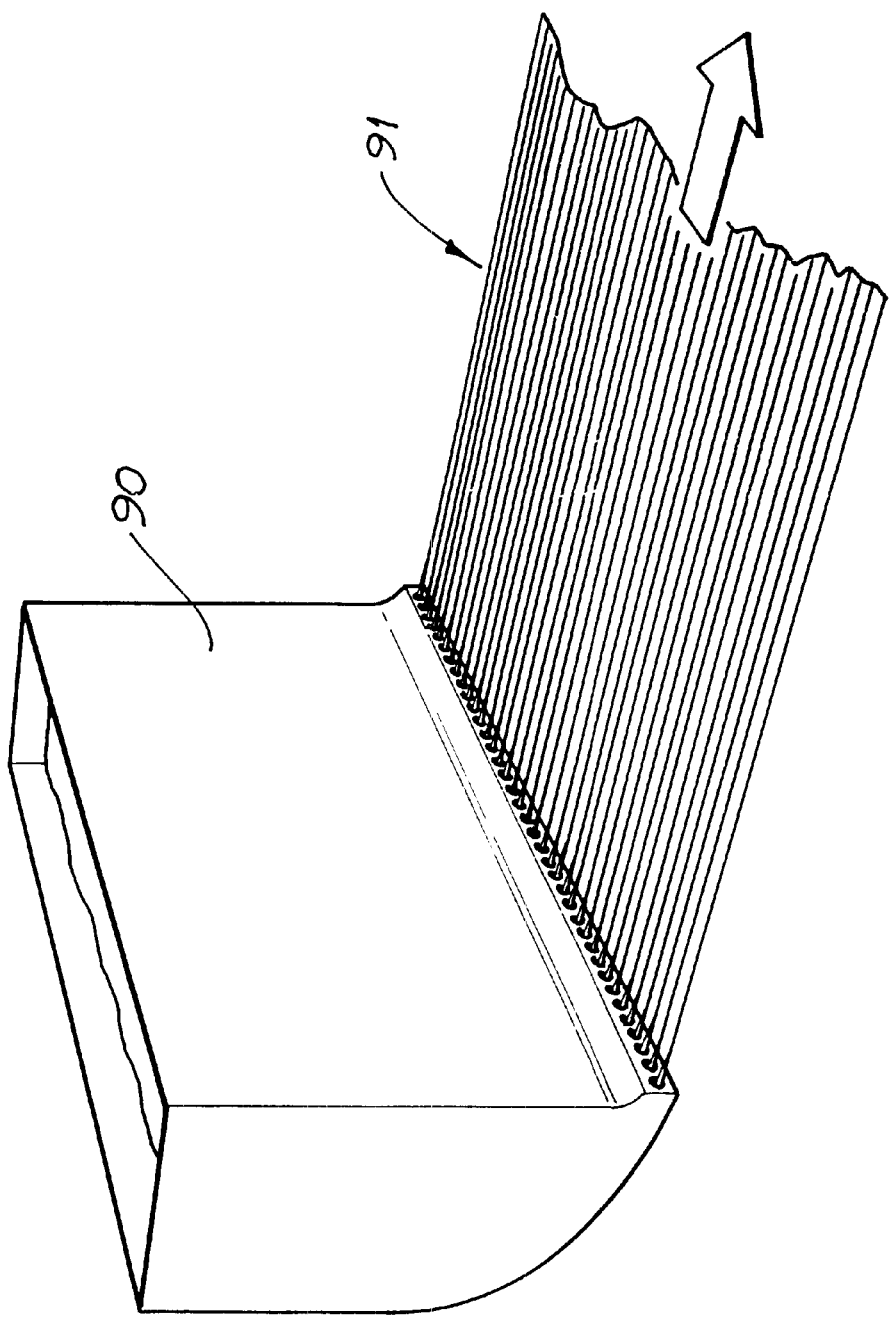
FIG. 9 illustrates an alternative form of manufacture by extruding fibrous material for utilization with the arrangement of FIG. 8.

Of course, alternative forms of creating the fibrous material on demand are possible. For example, in FIG. 9, there is illustrated one form of creating an extruded fibrous material by means of drawing fibre e.g. 91 from a vat 90, the arrangement of FIG. 9 designed to replace the need for spools 80 of FIG. 8.

It would be obvious to those skilled in the art that other forms of forming the anisotropic surface may be possible, the foregoing describing only a number of embodiments. Further modifications, obvious to those skilled in the art, can be made to the composition and structure of the anisotropic print media without departing from the scope of the invention as disclosed in the following claims.

I claim:

1. A digital camera print roll of print media, the print media having a surface on which an image is to be printed by said digital camera, said print media having anisotropic stiffness which is provided by means of a periodic variation in stiffness of the print media in a direction normal to a rotational axis of the roll, the anisotropic stiffness reducing residual curl in the print media arising as a result of its having been stored in a rolled condition.

2. The roll of print media as claimed in claim 1 in which the stiffness is provided by a plurality of regularly spaced, parallel ribs extending parallel to the axis of the roll to provide greatest stiffness in a direction parallel to said axis of the roll.

3. The roll of print media as claimed in claim 2 in which the ribs are formed by pinching the print media in a corrugated roller.

4. The roll of print media as claimed in claim 2 in which the ribs are provided by a plurality of spaced fibers over which a print media-defining material is applied.

5. The roll of print media as claimed in claim 4 in which said fibers are formed by extrusion of a polymer through an extrusion die.

6. The roll of print media as claimed in claim 4 in which said fibers are formed of polyethylene napthalate.

7. The roll of print media as claimed in claim 1 in which a wavelength of said periodic variation is about 200 microns.

* * * * *

UNITED STATES PATENT AND TRADEMARK OFFICE
CERTIFICATE OF CORRECTION

PATENT NO.   : 6,472,052 B1
DATED        : October 29, 2002
INVENTOR(S)  : Kia Silverbrook It is certified that error appears in the above-identified patent and that said Letters Patent is hereby corrected as shown below:

<u>Title page,</u>
Item [54], Title, should read -- ANISOTROPIC RIGIDITY TO REDUCE CURL IN ROLLED MEDIA --.

Signed and Sealed this

Ninth Day of May, 2006

JON W. DUDAS
*Director of the United States Patent and Trademark Office*